United States Patent [19]

Schneider

[11] 3,959,215
[45] May 25, 1976

[54] STABILIZATION OF LINEAR POLYESTERS
[75] Inventor: Ewald Schneider, Tamins, Switzerland
[73] Assignee: Inventa AG fur Forschung und Patentverwertung, Zurich, Switzerland
[22] Filed: Sept. 17, 1974
[21] Appl. No.: 506,784

[30] Foreign Application Priority Data
Sept. 24, 1973 Switzerland.................... 13660/73

[52] U.S. Cl..................... 260/45.8 NZ; 260/75 N; 260/75 T; 260/307 F
[51] Int. Cl.².................. C08K 5/35; C08L 67/02
[58] Field of Search......... 260/45.8 NZ, 75 N, 75 T, 260/307 F

[56] References Cited
UNITED STATES PATENTS
3,051,212  8/1962  Daniels .................. 260/75
3,657,191  4/1972  Titzmann et al. ......... 260/75
3,692,745  9/1972  Molenaar ............... 260/75

OTHER PUBLICATIONS
Fukui et al., Chem. Abs., Vol. 72, 1970, 112313x.

Frump, Chem. Revs., Vol. 71, No. 5, 1971, pp. 494 and 495.

Primary Examiner—Donald E. Czaja
Assistant Examiner—R. A. White
Attorney, Agent, or Firm—Jordan B. Bierman; Linda Bierman; Kenneth J. Stempler

[57] ABSTRACT

The invention relates to a process for reducing degradation in the spinning of fiber-forming polyesters by adding to the polyester granules before spinning compounds of the general formula

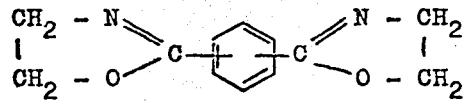

in which hydrogen atoms may be replaced by alkyl or aryl radicals. These compounds react with the carboxyl end groups of the polyester, whereby in addition to the lesser degradation, a reduction of the number of free carboxyl end groups in the fiber is also obtained.

11 Claims, No Drawings

STABILIZATION OF LINEAR POLYESTERS

This application claims the priority of Swiss application No. 13660/73 filed Sept. 24, 1973.

Polyesters useful in this invention can be prepared in known manner from, for example, dicarboxylic acids or their ester-forming derivatives and diols by heating to temperatures of up to 300°C. As dicarboxylic acid terephthalic acid is preferable, if necessary in combination with other aromatic and/or aliphatic dicarboxylic acids. As diols there may be employed aliphatic diols of the general formula HO . (CH$_2$)$_n$ . OH in which $n$ signifies a whole number from 2–10; substituted aliphatic diols such as, for example, 2,2-dimethyl-propanediol-1,3; and/or cycloaliphatic diols such as 1,4-bishydroxymethylcyclohexane. Furthermore, other ester-forming compounds such as hydroxycarboxylic acids or polyalkylene oxides can be employed to produce polyesters. High molecular-weight linear polyesters or copolyesters are obtained which may contain various additives such as, for instance, delustering agents. These polyesters have molecular chains which have primarily OH- and COOH- groups as end groups.

When the spinning operation is carried out, the polyesters, which are generally in the form of chips, are usually melted in an extruder and conveyed by means of a screw into a spinning unit from where they are spun into filaments through a spinneret plate. In the process, the polyester is thermally and hydrolytically degraded to a certain extent, the extent of this degradation depending on the temperature and the dwell time in the extruder. These degradation reactions cause, on the one hand, a reduction of the molecular weight and, consequently of the viscosity, of the polyester, and on the other hand, an increase in the concentration of carboxyl end groups.

While the problem is described herein with relation to spinning of polyester fibers, it also arises in the formation of the polyester into any shape or form. Clearly, degradation occurs whenever the polyester is melted and the process of the present invention is intended to apply to all such situations.

If molded bodies of polyester or the articles produced therefrom are subjected in practical use to stress, especially rather high temperatures or lengthy action of moisture, alcohols, acids or amines, degradation reactions such as hydrolysis, alcoholysis, acidolysis or aminolysis also take place. This lowers the molecular weight of the polyester further and hence reduces its strength. The extent of these degradation reactions, in particular that of the hydrolysis, is dependent particularly on the concentration of carboxyl end groups. The higher the content of carboxyl groups, the more marked is the degradation.

A number of proposals have been made to reduce the concentration of carboxyl end groups of the polyester, and thereby increasing its stability in relation to degradation reactions, by adding suitable compounds thereto. These compounds are distinguished by functional groups which are able to react with the carboxyl end groups of the polyester. Among these compounds there have also been named some having two functional groups which, provided that both groups react with polyester end groups, enter into reactions which increase molecular weight, whereby at least partial compensation of the degradation during spinning can be achieved.

There are, however, disadvantages attaching to the use of the processes which have been known heretofore. Thus, in British Pat. No. 1,139,379, it is admitted that diepoxides produce undesirable cross-linking of the polyester. The carbodiimides known from U.S. Pat. Nos. 3,193,522 and 3,193,523 are generally not sufficiently stable and the use thereof results in discoloration of the polyester. The use of ketenes and diketenes is known from Belgian Pat. No. 553,273. Ketenes, however, react with carboxyl groups to form anhydride groups, as a result of which the polyester remains sensitive to hydrolysis. Because of the reactivity of ketenes, particularly with regard to atmospheric moisture, the handling thereof is complicated.

It has now been found that these disadvantages are eliminated when phenylene-bisoxazolines are employed. These compounds can be handled without any problems and can be applied in simple form, as, for example, by powdering the polyester chips with them. According to the present invention, the compounds concerned are compounds of the general formula

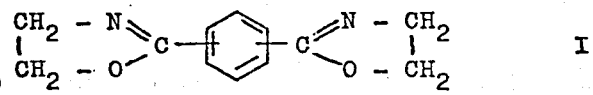   I in which the hydrogen atoms may be replaced by alkyl or aryl radicals. The unsubstituted compounds of formula I being, however, preferred for practical reasons.

During the spinning operation, the bisoxazolines enter into addition reactions with the carboxyl groups in question, and thus the concentration of carboxyl end groups in the polyester is reduced. At the same time, an increase in the molecular weight of the polyester chains takes place and this at least partially compensates for the degradation usually occurring during spinning.

The bisoxazolines used according to the invention are known per se and can be prepared, for example, as described by J. A. Frump, Chem. Reviews 71 (5), 483-505 (1971) and in DOS 2,135,644.

When the compounds according to the invention are added to the polyester, it is possible to produce from granules of a given polyester, a filament of higher solution viscosity than is the case without the addition. In addition, a filament produced in accordance with the invention exhibits correspondingly higher mechanical strength values. Because of the aforementioned reduction in the concentration of carboxyl end groups, this filament also possesses a better hydrolytic stability than a filament produced without any such addition.

The amount of bisoxazoline added depends on its molecular weight and on the content of free COOH groups in the polyester in question. The amount of bisoxazoline added is advantageously from 0.05 to 5% by weight based on the polyester, and preferably between 0.1 and 1% by weight. The application of the bisoxazolines may be effected by sprinkling them in powder form onto dried polyester granules in the substantial absence of moisture or by sprinkling them in powder form onto undried polyester granules followed by drying. The polyester granules obtained in this way may be employed for producing shaped or molded elements generally, and in particular filaments, fibers, tire cord and other textile material.

The following examples are intended to illustrate the essence of the present invention more fully, but without limiting it in any way. The analytical values given were determined as follows:

The relative viscosity $\eta_{rel}$ was measured by a 0.5% by weight solution of the polyester in a mixture of phenol and 1,1,2,2-tetrachloroethane (60/40% by volume) at 20°C. To determine the concentration of free carboxyl groups [COOH], a weighed amount of polyester was dissolved in a mixture of phenol and chloroform and titrated with a solution of caustic potash in benzyl alcohol using tetrabromophenol blue as the indicator. As a measure of stability against hydrolytic degradation, reference was made to the reduction in the viscosity of the polyester after a 6-hour treatment with water at 130°C (measured in the Lini test apparatus of Quarzlampen GmbH, Hanau, Federal Republic of Germany). The reduction in viscosity was calculated in % broken bonds (% BB) in accordance with the equation $$\% \text{ BB} = 50 \left( \frac{1}{\overline{Pn_n}} - \frac{1}{\overline{Pn_v}} \right)$$

$\overline{Pn_v}$ and $\overline{Pn_n}$ standing for the degree of polymerization before and after the hydrolytic degradation respectively. Extension at break and tenacity were determined on a tensile strength testing machine made by the firm of Karl Frank, Mannheim, Federal Republic of Germany, with constant feed.

EXAMPLE 1

Dried undelustered polyethylene terephthalate granules with $\eta_{rel} = 1.382$ and [COOH] = 30 mval/kg were sprinkled with 0.4% by weight of 1,4-phenylene-bis-Δ2-oxazoline-2 (1,4-PBO) powder in a drum under a dry inert gas atmosphere. These granules were melted by means of an extruder and conveyed into a spinning unit from which the melt was spun into filaments through a 30-hole spinneret at a delivery rate of 88 g/min. The values for $\eta_{rel}$ and [COOH] determined in the filaments produced in this way are given in Table I.

COMPARISON EXAMPLE A

The polyethylene terephthalate granules described in Example 1 were spun under the same conditions as in Example 1 but without any addition of (1,4-PBO). The values for $\eta_{rel}$ and [COOH] found in the filaments produced in this way are likewise given in Table I.

Table I

| Example | Addition | in the filament | | Degradation during spinning |
|---|---|---|---|---|
| | | $\eta$ rel | [COOH] | Δ $\eta$ rel |
| 1 | 0.4% by weight 1,4-PBO | 1.378 | 26 | 0.004 |
| A | — | 1.344 | 46 | 0.038 |

EXAMPLE 2

Dried polyethylene terephthalate granules delustered with 0.3% by weight of $TiO_2$ and with $\eta_{rel} = 1.478$ and [COOH] = 48 mval/kg were sprinkled with 0.35% by weight of 1,3-phenylene-bis-Δ2-oxazoline-2 (1,3-PBO) powder in a drum under a dry inert gas atmosphere. These granules were spun as described in Example 1, the delivery rate being 70 g/min. The values for $\eta_{rel}$ and [COOH] determined in the filaments produced in this way are given in Table II.

COMPARISON EXAMPLE B

The polyethylene terephthalate granules described in Example 2 were spun under the same conditions as in Example 2, but without any addition of (1,3-PBO). The values for $\eta_{rel}$ and [COOH] determined in the filaments produced in this way are given in Table II.

Table II

| Example | Addition | in the filament | | Degradation during spinning |
|---|---|---|---|---|
| | | $\eta$rel | [COOH] | Δ $\eta$ rel |
| 2 | 0.35% by weight 1,3-PBO | 1.468 | 41 | 0.010 |
| B | — | 1.413 | 60 | 0.065 |

EXAMPLE 3

The spun filaments obtained in Examples 1, A, 2 and B were stretched by the methods conventionally employed for polyesters. The results found with the filaments obtained are compiled in Table III.

Table III

| Example | Extension at break | Tenacity | Hydrolytic degradation % BB |
|---|---|---|---|
| 1 | 20.2 % | 5.4 g/den | 0.027 |
| A | 20.0 % | 5.0 g/den | 0.073 |
| 2 | 22.4 % | 5.5 g/den | 0.032 |
| B | 23.0 % | 5.2 g/den | 0.076 |

Table III shows the effect of the addition of the bisoxazolines according to the invention, which makes itself clearly noticeable both in the strength and in the hydrolytic stability of the polyester filaments obtained.

EXAMPLE 4

Dried undelustered polybutylene terephthalate granules with $\eta_{rel} = 1.402$ and [COOH] = 36 mval/kg were sprinkled with 0.6% by weight of 1-methyl-3,5-phenylene-bis(5-methyl-Δ2-oxazoline-2) (MPBMO) powder in a drum under a dry inert gas atmosphere. These granules were melted by means of an extruder and conveyed into a spinning unit, from which the melt was spun into filaments through a 30-hole spinneret at a delivery rate of 88 g/min. The valves of $\eta_{rel}$ and [COOH] determined in these filaments are given in Table IV.

COMPARISON EXAMPLE C

The polybutylene terephthalate granules described in Example 4 were spun under the same conditions as in Example 4, but without any addition of (MPBMO). The values for $\eta_{rel}$ and [COOH] found in these filaments are likewise given in Table IV.

Table IV

| Example | Addition | in the filament η rel | [COOH] | Degradation during spinning Δ η rel |
|---|---|---|---|---|
| 4 | 0.6% by weight MPBMO | 1.395 | 29 | 0.007 |
| C | — | 1.356 | 45 | 0.048 |

What is claimed is:

1. In a process for shaping a linear polyester comprising heating said polyester and forming said polyester into the desired shape, the improvement which comprises adding to said polyester at or before said forming a compound of the formula

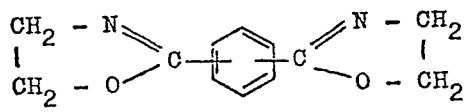

wherein the hydrogen atoms may be substituted by one or more alkyl or aryl radicals.

2. A process according to claim 1 wherein said polyester is fiber-forming and said shape is a filament.
3. A process according to claim 1 wherein said polyester is polyethylene terephthalate or polybutylene terephthalate.
4. A process according to claim 1 wherein said compound is unsubstituted.
5. A process according to claim 1 wherein said compound is 1,4-phenylene-bis-Δ2-oxazoline-2.
6. A process according to claim 1 wherein said compound is 1,3-phenylene-bis-Δ2-oxazoline-2.
7. A process according to claim 2 wherein said filament is spun in the presence of 0.05 to 5.0% by weight of said compound based on said polyester.
8. A process according to claim 7 wherein said compound is present in an amount of 0.1 to 1.0% by weight based on said polyester.
9. A shaped body which is the product of the process of claim 1.
10. A process according to claim 1 wherein said compound is 1-methyl-3,5-phenylene-bis(5-methyl-Δ2-oxazoline-2).
11. A process according to claim 1 wherein said radicals are taken in the class consisting of methyl, ethyl, propyl, butyl, cyclohexyl, phenyl and tolyl.

* * * * *